E. A. McKOY.
TURPENTINE CUP.
APPLICATION FILED JUNE 10, 1907.

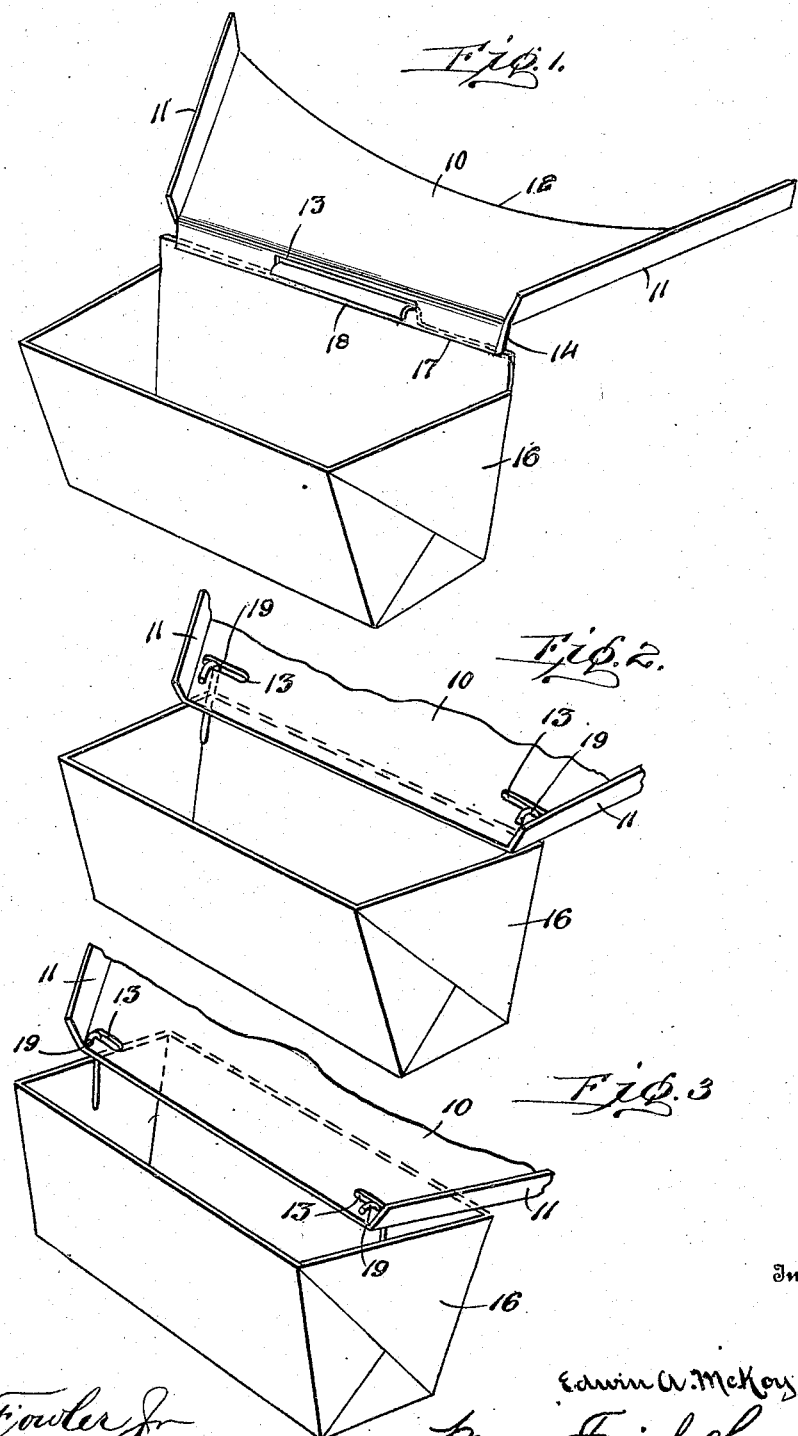

942,211.

Patented Dec. 7, 1909.
2 SHEETS—SHEET 2.

UNITED STATES PATENT OFFICE.

EDWIN ANDERSON McKOY, OF NEW ORLEANS, LOUISIANA.

TURPENTINE-CUP.

942,211.  Specification of Letters Patent.  Patented Dec. 7, 1909.

Application filed June 10, 1907. Serial No. 378,205.

*To all whom it may concern:*

Be it known that I, EDWIN A. McKOY, a citizen of the United States, residing at New Orleans, in the parish of Orleans and State of Louisiana, have invented certain new and useful Improvements in Turpentine-Cups; and I do hereby declare the following to be a full, clear, and exact description of the invention, such as will enable others skilled in the art to which it appertains to make and use the same.

This invention relates to turpentine gathering means, and has for an object to provide an apron of improved form adapted to be secured to a turpentine bearing tree, and a receptacle adapted to engage the improved form of apron.

A further object of the invention is to provide in a device of the described class an apron adapted to be secured to the tree and an improved form of receptacle provided with upstanding hooks adapted to engage the apron.

A further object of the invention is to provide in a device of the described class an apron having an improved form of engaging means provided at its lower longitudinal edge.

A further object of the invention is to provide in a device of the described class an apron having openings formed at its lower longitudinal edge and with a receptacle having upstanding means adapted to hook within the opening and support the receptacle therefrom.

With these and other objects in view, the invention comprises certain novel constructions, combinations and arrangements of parts, as will be hereinafter fully described and claimed.

Figure 4:
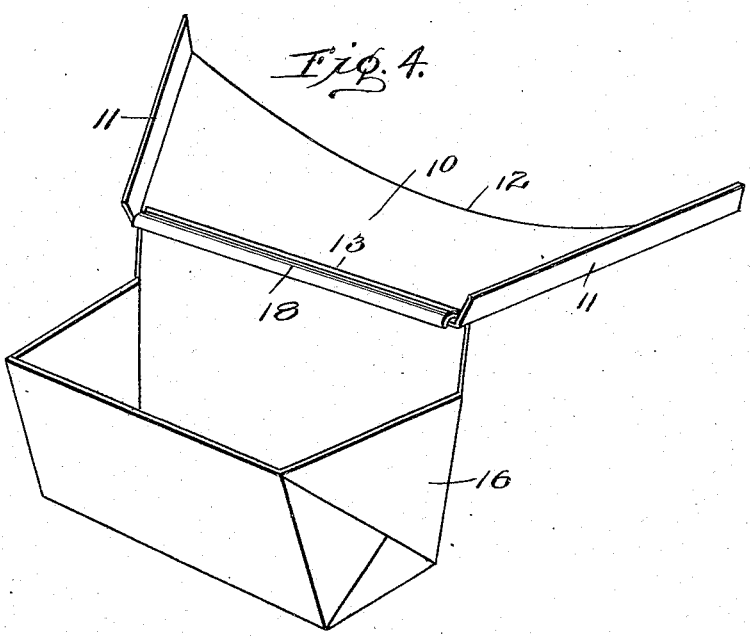
Figure 5:
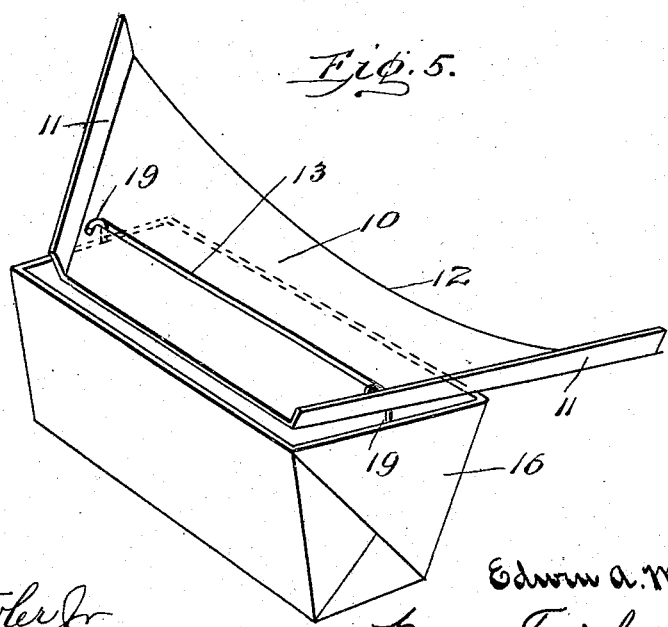

In the drawings:—Figure 1 is a perspective view of the improved turpentine gathering means showing an apron provided with a down-turned flange which has an opening through which is inserted a hook formed upon the side of the receptacle. Fig. 2 is a view in perspective of the lower edge of the apron provided with spaced openings, and a receptacle provided with upstanding hooks adapted to hook through and to be supported through the openings. Fig. 3 is a view in perspective of the lower longitudinal edge of an apron similar to that shown at Fig. 2 with the receptacle shown with the hooks upstanding from substantially the middle of the ends of the receptacle and hooked through the openings. Fig. 4 is a perspective view of the improved apron and receptacle having a slot formed substantially the entire length of the apron and the receptacle formed with a hook engaging within said slot. Fig. 5 is a perspective view of the device showing a slot formed longitudinally of the apron away from the lower longitudinal edge and with a receptacle having hooks disposed intermediate the longitudinal edges and positioned to engage within the slot.

Like characters of reference designate corresponding parts throughout the several views.

The apron forming the subject-matter of the present application comprises a substantially plain body portion 10 having preferably at its opposite ends upstanding converging flanges 11 and with or without the upper or longer longitudinal edge curved as at 12, the formation of such edge forming no essential part of the present invention.

Adjacent the lower edge of the apron one or more holes or openings 13 are provided, such openings being formed either directly in the plain surface of the apron, as shown in Figs. 2 and 3, or in the flange 14 extending downwardly from the lower edge of the apron.

For use in association with the apron provided with the openings a receptacle 16 is employed having an upstanding side 17, as shown in Fig. 1, with a curved hook or flange 18 or with hooks 19 secured to the rearward side of the receptacle as shown in Fig. 2, or intermediate the sides and secured to the end walls, as shown in Fig. 3.

It will be noted that in all of the figures 1, 2 and 3, the apron is provided with openings at its lower edge and the receptacle with upstanding hooks to hook within and engage such openings and to suspend the receptacle therefrom.

In Fig. 4 an apron is employed wherein the slot 13 extends substantially the entire length of the receptacle adjacent its lower longitudinal edge and the hook 18 of the apron is proportioned to be inserted through such slot and suspend the receptacle in such manner as to prevent tilting or tipping longitudinally.

In Fig. 5 the slot 13 is shown formed longitudinally of the apron but intermediate the longitudinal edges with the hooks 19 inserted therethrough as in Figs. 2 and 3, but so proportioned that the apron substantially covers the entire open side of the cup, the lower longitudinal edge being spaced but a little distance away from the edge of the cup.

It is desirable to so suspend the receptacle beneath the apron that it cannot tilt to any considerable extent longitudinally, for which reason the devices here shown are supported at points spaced longitudinally of the receptacle, and so arranged that tilting is prevented. The reason for the necessity or desirability of preventing the longitudinal tipping of the receptacle is that the contained pitch is likely to run over the end of the receptacle when so tilted, and be lost and the tilting is caused by an unequal filling of the receptacle from a more copious discharge of the pitch upon one end of the apron than the other, whereby one end of the receptacle becomes filled sooner than the other, and, owing to the viscosity of the pitch, it does not flow readily from one end to the other, thereby weighing one end more than the other and causing the tilting. When the receptacle has once become tilted the continued discharge of the pitch does not right the receptacle and the continued flow therein will fill the receptacle above the lowered side.

Although shown in Figs. 1 and 2 with the hooks 19 secured in the corners of one side of the receptacle, it is to be understood that such hooks need not be secured exactly at the corners but may be attached at any desired and convenient point or points on the rear side wall of the receptacle.

What I claim is:—

1. In a device of the class described, an apron provided with an opening formed adjacent its lower longitudinal edge, and a receptacle provided with an upstanding member having means for interengagement with the opening in the edge of the apron.

2. In a device of the class described, an apron provided with an opening adjacent its lower longitudinal edge, and a receptacle provided with a hook upstanding therefrom and adapted to engage within the opening.

3. In a device of the class described, an apron provided with a flange downwardly turned at its lower longitudinal edge, and with an opening formed therein, and a receptacle provided with means upstanding therefrom adapted to engage within the opening.

4. In a device of the class described, an apron provided with a down-turned flange at its lower longitudinal edge and with an opening formed therein, and a receptacle provided with a hook upstanding therefrom and proportioned to hook within the opening and suspend the receptacle beneath the lower longitudinal edge.

5. In a device of the class described, an apron, an opening formed adjacent the lower longitudinal edge of the apron, a receptacle, and means upstanding from the receptacle adapted to engage within the opening and support the receptacle from spaced points.

6. In a device of the class described, an apron provided with an opening extending longitudinally thereof and disposed intermediate its longitudinal edges, and a receptacle having a hook upstanding therefrom, and adapted to engage within the opening and suspend the receptacle from points spaced longitudinally of the apron.

In testimony whereof I affix my signature in presence of two witnesses.

EDWIN ANDERSON McKOY.

Witnesses:
  A. VIZARD, Jr.,
  E. WOOD.